United States Patent
Nagae et al.

(10) Patent No.: US 7,014,375 B2
(45) Date of Patent: Mar. 21, 2006

(54) THERMAL PRINTER AND METHOD DETERMINING BATTERY CONDITION BASED ON TEMPERATURE

(75) Inventors: Tsuyoshi Nagae, Kasugai (JP); Takashi Horiuchi, Kariya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/896,969

(22) Filed: Jul. 23, 2004

(65) Prior Publication Data

US 2005/0058484 A1   Mar. 17, 2005

(30) Foreign Application Priority Data

Aug. 29, 2003   (JP) ............................. 2003-306911

(51) Int. Cl.
*B41J 11/44*   (2006.01)
*B41J 1/54*   (2006.01)

(52) U.S. Cl. .............. 400/76; 400/125.05; 400/124.03; 400/120.01

(58) Field of Classification Search .................. 400/76, 400/125.05, 124.03, 615.2, 208, 120.01; 347/194, 17, 216, 172, 192, 14, 296
See application file for complete search history.

(56) References Cited

U.S. PATENT DOCUMENTS

| | | | | |
|---|---|---|---|---|
| 4,540,295 A | | 9/1985 | Okunishi et al. ...... 400/124.03 |
| 4,947,262 A | * | 8/1990 | Yajima et al. .............. 358/296 |
| 5,162,741 A | * | 11/1992 | Bates ......................... 324/431 |
| 5,321,627 A | * | 6/1994 | Reher .......................... 702/63 |
| 5,339,018 A | * | 8/1994 | Brokaw ...................... 320/147 |
| 5,365,257 A | * | 11/1994 | Minowa et al. ............. 347/189 |
| 5,383,733 A | * | 1/1995 | Zinsmeyer et al. ......... 400/208 |
| 5,475,405 A | * | 12/1995 | Widder et al. ................ 347/14 |
| 5,534,890 A | * | 7/1996 | Krug et al. .................. 346/100 |
| 5,534,909 A | * | 7/1996 | Hanabusa et al. .......... 347/216 |
| 5,758,980 A | * | 6/1998 | Takenaka ..................... 400/611 |
| 5,772,340 A | * | 6/1998 | Nunokawa et al. ............ 400/70 |
| 5,964,539 A | * | 10/1999 | Yamaguchi et al. ... 400/120.16 |
| 6,020,722 A | * | 2/2000 | Freiman ...................... 320/164 |
| 6,107,802 A | * | 8/2000 | Matthews et al. .......... 324/427 |
| 6,198,254 B1 | * | 3/2001 | Satake et al. ............... 320/132 |
| 6,366,475 B1 | | 4/2002 | Nakazawa et al. ....... 363/21.01 |
| 6,453,249 B1 | * | 9/2002 | Shibutani et al. ............. 702/63 |
| 6,709,083 B1 | * | 3/2004 | Fukushima .................. 347/17 |
| 6,759,829 B1 | * | 7/2004 | Becker-Irvin ............... 320/128 |
| 6,784,908 B1 | * | 8/2004 | Shibuya ...................... 347/192 |

(Continued)

FOREIGN PATENT DOCUMENTS

EP   A1 0 686 508   * 12/1995

(Continued)

*Primary Examiner*—Andrew H. Hirshfeld
*Assistant Examiner*—Wasseem H. Hamdan
(74) *Attorney, Agent, or Firm*—Oliff & Berridge PLC (57) ABSTRACT

A tape print apparatus is capable of setting a weak voltage value, serving as a criterion on indicating a power weakness condition on a display, to an appropriate voltage value based on various kinds of usage conditions by considering that the degree of consumption of drive power differs depending on the usage conditions of a tape print apparatus.

46 Claims, 7 Drawing Sheets

U.S. PATENT DOCUMENTS

| | | | | |
|---|---|---|---|---|
| 6,820,958 B1 * | 11/2004 | Miyakoshi | ................... | 347/17 |
| 6,850,041 B1 * | 2/2005 | Takano | ...................... | 320/150 |
| 6,909,261 B1 * | 6/2005 | Laig-Horstebrock et al. | ....... | 320/132 |
| 2002/0080260 A1 * | 6/2002 | Ojima | ........................ | 348/348 |
| 2002/0113833 A1 * | 8/2002 | Fukushima | .................. | 347/17 |
| 2002/0163569 A1 * | 11/2002 | Shibuya | ..................... | 347/172 |
| 2004/0031875 A1 * | 2/2004 | Nonomura | .................. | 242/566 |
| 2004/0190971 A1 * | 9/2004 | Tanaka | .................... | 400/615.2 |

FOREIGN PATENT DOCUMENTS

| JP | A 8-58197 | 3/1996 |
|---|---|---|
| JP | A 10-81052 | 3/1998 |

* cited by examiner

| DETECTION TEMPERATURE t (°C) | t<15°C | 15°C ≦ t <30°C | 30°C ≦ t |
|---|---|---|---|
| WEAK VOLTAGE VALUE (V) | 6.0 | 5.5 | 5.0 |

FIG. 5B

| KIND OF PRINT RIBBON | LAMINATE PRINT TYPE RIBBON | RECEPTOR PRINT TYPE RIBBON | CLOTH TRANSFER TYPE RIBBON |
|---|---|---|---|
| COEFFICIENT | 1.0 | 1.05 | 1.1 |

FIG. 5C

| PRINT TYPE WIDTH | 6, 9, 12mm | 18, 24mm | 36mm |
|---|---|---|---|
| COEFFICIENT | 1.0 | 1.05 | 1.1 |

FIG. 5D

| QUANTITY OF HEAT GENERATING DEVICES | 1~64DOT | 65~128DOT | 129~384DOT |
|---|---|---|---|
| COEFFICIENT | 1.0 | 1.05 | 1.1 |

FIG. 6

THERMAL PRINTER AND METHOD DETERMINING BATTERY CONDITION BASED ON TEMPERATURE

BACKGROUND OF THE INVENTION

1. Field of Invention

The present invention relates to a portable tape print apparatus in which a tape cassette incorporating a long tape is accommodated, a platen roller is driven by a drive motor using a drive power source such as a battery and a heat generating device of a thermal head is heated according to print data to print on the tape and discharge it to the outside, and more particularly a print apparatus capable of indicating an appropriate weak battery condition corresponding to various different usage conditions considering that the degree of consumption of the drive power source differs depending on the usage condition of the tape print apparatus.

2. Description of Related Art

If a voltage supplied from a DC power supply in a print apparatus such as a tape print apparatus which is driven by the DC power supply (e.g. a battery) drops below a predetermined voltage value, various problems relating to printing and control occur. Therefore, to solve such problems, for example, Japanese Patent Application Laid-Open No. 8-58197 discloses a print apparatus having a power weakness determination voltage memory means for memorizing a power weakness determination voltage corresponding to each print width, which can be changed to multiple levels corresponding to print data, and an output voltage detecting means for detecting an output voltage of the DC power supply. A determination is made as to whether or not the output voltage detected by the output voltage detecting means through the power weakness determining means is smaller than a power weakness determination voltage corresponding to the set print width, and if it is determined that the output voltage is smaller than the power weakness determination voltage, a notification that there is a power weakness condition is made through a power weakness notifying means.

Japanese Patent Application Laid-Open No. 10-81052 discloses a plate making apparatus having a power weakness determination voltage memory means which is set corresponding to each print face size of a stamp body detected by a print face size detecting means, and an output voltage detecting means for detecting an output voltage of a DC power supply. A determination is made as to whether or not the output voltage detected by the output voltage detecting means through the power weakness determination means is smaller than the power weakness determination voltage corresponding to the print face size of the stamp body detected by the print face size detecting means, and if it is determined that the output voltage is smaller than the power weakness determination voltage, a notification that there is a power weakness condition is made through a power weakness notifying means.

According to the print apparatus disclosed in the aforementioned Japanese Patent Application Laid-Open No. 8-58197, print failure due to power weakness can be prevented by setting a power weakness determination voltage corresponding to a print width. Further, according to the plate making apparatus disclosed in Japanese Patent Application Laid-Open No. 10-81052, plate making failure due to power weakness can be prevented by setting an optimum power weakness determination voltage corresponding to a plate making width.

SUMMARY OF THE INVENTION

However, there exist various different factors which affect consumption of DC power other than the aforementioned print width and plate making width in the tape print apparatus for printing characters and the like on a print medium such as a tape, paper using heat generating devices provided on a thermal head and various kinds of the print apparatus. Thus, determination of power weakness corresponding to only the print width and plate making width provides insufficient results.

One object of the present invention is to provide a tape print apparatus which is capable of setting a weak voltage value, serving as a criterion for indicating a power weakness condition on a display, to an appropriate voltage value corresponding to various different usage conditions by considering that the degree of consumption of drive power differs depending on the usage condition of a tape print apparatus, and indicating the power weakness condition appropriately corresponding to a usage condition.

To achieve the above and/or other objects, according to one aspect of the present invention, there is provided a tape print apparatus that preferably includes a cassette accommodating section formed in a main body thereof for accommodating a tape cassette that contains a print tape, a thermal head in which a plurality of heat generating devices are arranged (e.g., in parallel) and which can print characters and the like on a print tape pulled out from the tape cassette by a tape feeding mechanism, a drive power supply accommodated in the main body and for driving the tape feeding mechanism and the thermal head, and a display for indicating that the drive voltage of the drive power supply drops below a predetermined weak voltage. The tape print apparatus further includes: an internal temperature detector that detects an internal temperature in the main body; and a voltage value determining means for determining the weak voltage value based on the internal temperature inside the main body detected by the internal temperature detector.

With this structure, the weak voltage value is determined by the voltage value determining means based on an internal temperature inside the apparatus detected by an internal temperature detector. Even if the degree of consumption of the drive power changes due to the internal temperature inside the apparatus, an appropriate weak voltage value can be established corresponding to changes in the internal temperature, so that the power weakness condition can be indicated on a display appropriately corresponding to the internal temperature inside the apparatus main body.

According to another aspect of the present invention, there is provided a tape print apparatus that preferably includes a cassette accommodating section formed in a main body thereof for accommodating a tape cassette which contains a print tape and a tape ribbon, a thermal head in which a plurality of heat generating devices are arranged (e.g., in parallel) and which can print characters and the like on a print tape pulled out from the tape cassette by a tape feeding mechanism, a drive power supply accommodated in the main body and for driving the tape feeding mechanism and the thermal head, and a display for indicating that the drive voltage of the drive power supply drops below a predetermined weak voltage. The tape print apparatus further includes: a head temperature detector that detects the temperature of the thermal head; and a voltage value determining means for determining the weak voltage value based on the head temperature of the thermal head detected by the head temperature detector.

With this structure, the weak voltage value is determined by the voltage value determining means based on the temperature of the thermal head detected by the head temperature detector. Thus, even if the degree of consumption of the drive power changes due to the temperature of the thermal head corresponding to the drive condition of the thermal head, an appropriate weak voltage value can be established corresponding to changes in the temperature of the thermal head. Consequently, the voltage weakness condition can be indicated on a display appropriately corresponding to the temperature of the thermal head.

The tape print apparatus may further include: a ribbon detector that detects the kind of a print ribbon accommodated in the tape cassette; and a weak voltage value changing means for changing a weak voltage value determined by the voltage value determining means based on the kind of the print ribbon detected by the ribbon detector.

With this structure, the kind of the print ribbon accommodated in the tape cassette is detected by the ribbon detector and the weak voltage value determined by the voltage value determining means is changed by the weak voltage value changing means based on the kind of the detected print ribbon. Thus, even if the print ribbon accommodated in the tape cassette changes, an appropriate weak voltage value can be set corresponding to the heat sensitivity level of each print ribbon. Consequently, the voltage weakness condition can be indicated on a display appropriately corresponding to the kind of the print ribbon.

The tape print apparatus may further include: a tape width detector that detects the tape width of a print tape contained in the tape cassette; and a weak voltage value changing means for changing a weak voltage value determined by the voltage value determining means based on the kind of the tape width of a print tape detected by the tape width detector.

With this structure, the tape width of a print tape accommodated in the tape cassette is detected by the tape width detector and the weak voltage value determined by the voltage value determining means is changed by the weak voltage changing means based on the tape width of the detected print tape. Thus, even if the tape width of the print tape accommodated in the tape cassette changes, an appropriate weak voltage value can be set based on the tape width of each print tape. Consequently, the voltage weakness condition can be indicated on a display appropriately corresponding to the tape width of the print tape.

The tape print apparatus may further include: a heat generating device quantity detecting means for detecting the quantity of heat generating devices used for printing from amongst plural heat generating devices arranged (e.g., in parallel) on the thermal head; and a weak voltage value changing means for changing the weak voltage value determined by the voltage value determining means based on the quantity of the heat generating devices on the thermal head detected by the heat generating device quantity detecting means.

With this structure, the quantity of the heat generating devices to be used for printing from amongst the plural heat generating devices arranged on the thermal head is detected by the heat generating device quantity detecting means and the weak voltage value determined by the voltage value determining means is changed by the weak voltage value changing means based on the quantity of the detected heat generating devices. Thus, even if the quantity of the heat generating devices that are to be used for printing changes in various ways, an appropriate weak voltage value can be set corresponding to the quantity of the heat generating devices. Consequently, the voltage weakness condition can be indicated on the display based on the quantity of the heat generating devices of the thermal head that are to be used for printing.

The tape print apparatus also may include two detecting devices out of (1) a ribbon detector that detects the kind of a print ribbon contained in the tape cassette, (2) a tape width detector that detects the tape width of a print tape contained in the tape cassette, and (3) a heat generating device quantity detecting means for detecting the quantity of heat generating devices to be used for printing out of plural heat generating devices arranged (e.g., in parallel) on the thermal head, and the tape print apparatus then further includes: a weak voltage value changing means for changing a weak voltage value determined by the voltage value determining means based on the two factors detected by the two detecting devices.

With this structure, two factors are detected by the two detecting devices, and the weak voltage value determined by the voltage value determining means is changed by the weak voltage value changing means based on those detected two factors. Thus, even if the two factors change, an appropriate weak voltage value can be set based on the two factors. Consequently, the power weakness condition can be indicated on a display appropriately corresponding to the two factors that change in the printing process.

The tape print apparatus also may include all three detecting devices, that is, (1) a ribbon detector that detects the kind of a print ribbon contained in the tape cassette, (2) a tape width detector that detects the tape width of a print tape contained in the tape cassette, and (3) a heat generating device quantity detecting means for detecting the quantity of heat generating devices to be used for printing out of plural heat generating devices arranged (e.g., in parallel) on the thermal head, and the tape print apparatus then further includes: a weak voltage value changing means for changing a weak voltage value determined by the voltage value determining means based on the three factors detected by the three detecting devices.

With this structure, the three factors are detected by the three detecting devices, and the weak voltage value determined by the voltage value determining means is changed by the weak voltage changing means corresponding to those detected three factors. Thus, even if the three factors change, an appropriate weak voltage value can be set corresponding to the three factors. Consequently, the voltage weakness condition can be indicated on the display appropriately corresponding to the three factors that change during printing.

The tape print apparatus also may include: a drive voltage detecting means for detecting the drive voltage of the drive power supply when printing is performed by the thermal head; and a display control means for displaying that the drive voltage of the drive power supply detected by the drive voltage detecting means is smaller than a weak voltage value changed by the weak voltage value changing means.

With this structure, a drive voltage of the drive power supply upon printing by the thermal head is detected by the drive voltage detecting means. If the detected drive voltage is smaller than the weak voltage value changed by the weak voltage value changing means, that fact is indicated on the display by the display control means after printing is ended. Thus, even if the drive voltage of the drive power supply becomes smaller than the weak voltage value, printing can be completed, thereby preventing printing from being interrupted.

BRIEF DESCRIPTION OF THE DRAWINGS

Exemplary embodiments of the invention will be described below in detail with reference to the accompanying drawings in which.

DETAILED DESCRIPTION OF EXEMPLARY EMBODIMENTS

Hereinafter, a tape print apparatus according to an exemplary embodiment of the present invention will be described in detail with reference to the accompanying drawings. First, the schematic structure of the tape print apparatus of this embodiment will be described with reference to FIGS. 1 and 2.

Figure 1:
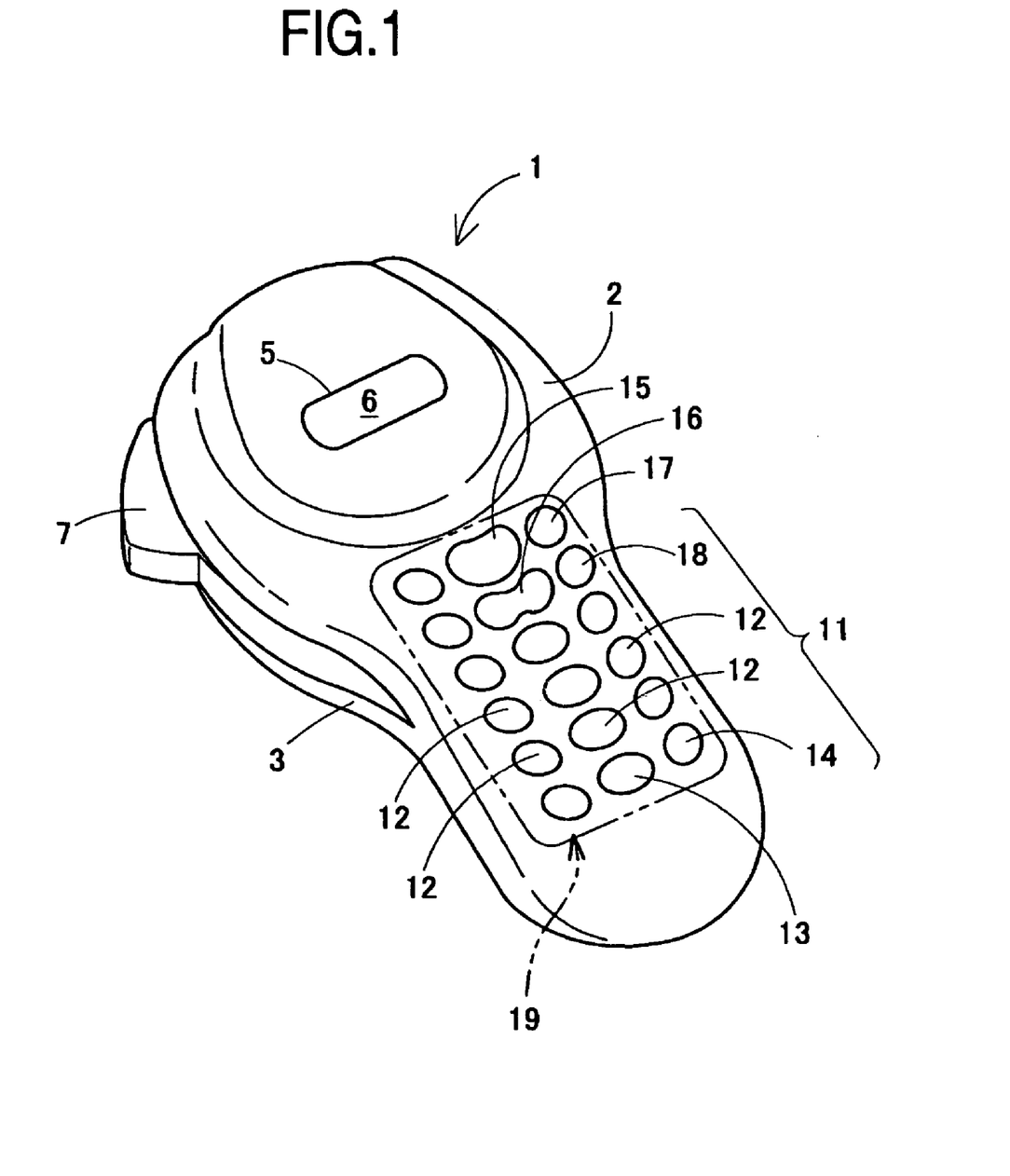
FIG. 1 is a schematic perspective view of a tape print apparatus of one exemplary embodiment of the invention.
Figure 2:
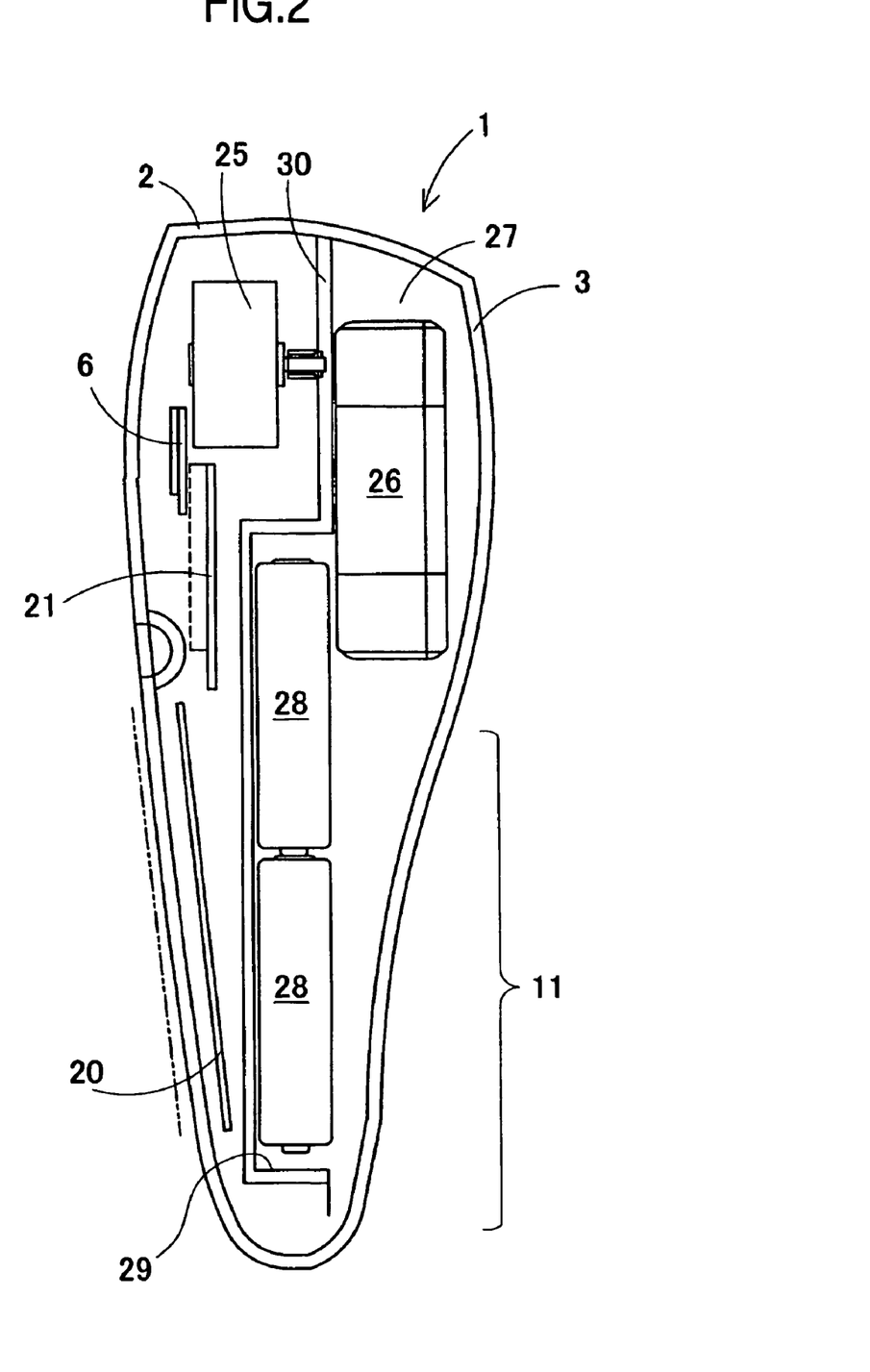
FIG. 2 is a schematic sectional view of the tape print apparatus of FIG. 1.

As shown in FIGS. 1 and 2, a tape print apparatus 1 includes a main body 2 made of any suitable material such as synthetic resin and a rear face cover 3 made of any suitable material such as synthetic resin which is mounted on the rear face (an opposite face to a face opposing an operator when the tape print apparatus 1 is used) of the main body 2. An upper, substantially half section in the length direction of the main body 2 is formed slightly round in its horizontal view and a window section 5 laterally long in the right and left direction is made substantially in the central section of this upper side surface and a display, such as, e.g., liquid crystal display 6 is disposed under this window section 5. A cutter lever 7 is provided on the side section on the left side of the liquid crystal display 6 of the main body 2, and if this cutter lever 7 is pressed inward with the thumb, printing is performed and a print tape 9 (see FIG. 3) discharged from a tape discharge port 8 (see FIG. 3) formed on the upper end can be cut with a cutter 10 (see FIG. 3). The print tape 9 includes an image receiving paper on which characters are to be printed, an adhesive agent layer and a separation paper protecting the adhesive agent face.

A grip section 11 is so constructed that the width in the right and left direction of a lower substantially half section in the length direction of the main body 2 is formed slightly smaller than the width in the right and left direction of the upper section, while corners at the right and left side faces are formed round. The corners at the right and left side faces corresponding to the grip section 11 of the rear face cover 3 also are formed round. The rear face cover 3 to be mounted on the main body 2 is formed so that the thickness of the tape print apparatus 1 decreases gradually from a section opposing the tape cassette 26 toward the grip section 11 and the thickness of the grip section 11, is smaller than that of a section accommodating the tape cassette 26 so that an operator can grip it easily.

A keyboard 19 is disposed on the surface of the grip section 11, the keyboard 19 being formed of soft rubber or the like and having character input keys 12 for creating text composed of text data, a space key 13 for inputting a space, a changeover key 14 for changing over between capital letters and small letters each time when it is pressed, a print key 15 for instructing to print a text, a cursor key 16 for moving a cursor to the right and left on the liquid crystal display 6, a power button 17 for turning ON/OFF the power, a return key 18 for instructing to select characters and the like.

Each character input key 12 is capable of changing between multiple alphanumeric characters for input each time it is pressed. For example, if "a, b, c, 2" is printed on a top face section of a character input key 12, "a", "b", "c" and "2" are displayed successively at the cursor position of the liquid crystal display 6 each time when this character input key 12 is pressed. When the return key 18 is pressed, that input letter is selected. Further, an alphabetic small letter "a", an alphabetic capital letter "A", an alphabetic small letter "b", an alphabetic capital letter "B", an alphabetic small letter "c" and an alphabetic capital letter "C" are changed over and displayed at the cursor position on the liquid crystal display 6 each time the changeover key 14 is pressed, and when the return key 18 is pressed, it is selected.

As shown in FIG. 2, a substrate 20 is disposed on the rear face section of the grip section 11 of the main body 2, and the keyboard 19 is disposed on the top face section of the grip section 11. A control board 21 which contains a control circuit is disposed on the rear face section between the grip section 11 of the main body 2 and the liquid crystal display 6. A drive motor 25 for driving the platen roller 23 (see FIG. 3), which functions as a tape feeding means, through a gear train (not shown) is disposed on the rear face section of the main body 2, more specifically on an upper side in the length direction of the main body on an opposite side to the thermal head 33, which will be described later, of this control board 21. An internal temperature thermistor 52 (see FIG. 4) for detecting an ambient temperature in the main body 2 is disposed on the control board 21.

A partition member 30 made of, e.g., synthetic resin has formed on a rear face section thereof: a cassette accommodating section 27 (see FIG. 3) for accommodating a tape cassette 26, and a battery accommodating section 29 (see FIG. 3) for accommodating six batteries 28, with each pair of batteries being connected in series, The partition member 30 is attached with screws 31 to an opening section on the rear face side of each substrate 20, 21, the liquid crystal display 6 and drive motor 25 and the like in the main body 2.

Next, the structure of this partition member 30 and the like will be described with reference to FIG. 3.

Figure 3:
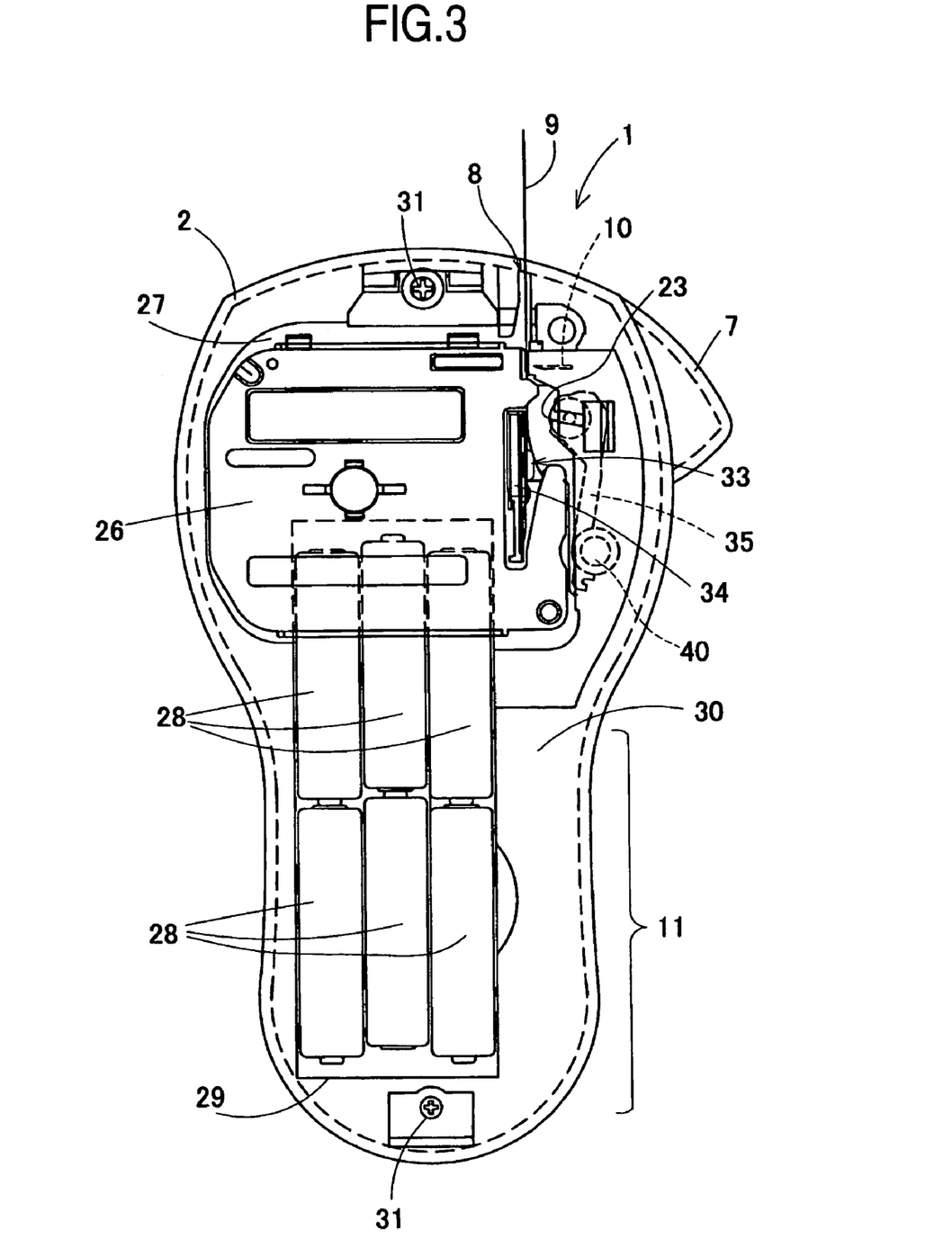
FIG. 3 is a schematic bottom view showing a condition in which a tape cassette is loaded with the rear cover of the tape print apparatus of the FIG. 1 embodiment removed.

As shown in FIG. 3, the cassette accommodating section 27, whose horizontal section is substantially rectangular like the external shape of the tape cassette 26 and formed such that it is expanded to the rear side into a depth substantially equal to the thickness of the tape cassette 26, is provided in an upper half section in the length direction of the partition member 30. A plurality of heat generating devices (not shown) of the thermal head 33 are disposed in parallel on the bottom face section near an edge section on the side of the cutter lever 7 of the cassette accommodating section 27, and a thin-plate thermal head mounting portion 34, on which the thermal head 33 for printing characters and the like on the print tape 9 through a ribbon (not shown) is to be mounted, is erected at a right angle outwardly in the length direction of the main body 2. The side face section of the cassette accommodating section 27 opposing the thermal head 33 is cut out, and a platen holder 35 is rotatably provided on the rear face section of the partition member 30 opposing this cut-out section, and is rotatable around a rotation shaft 40 at its bottom end. A head temperature thermistor 54 (see FIG. 4) for detecting an ambient temperature in the vicinity of the heat generating device of the thermal head 33 is disposed in the vicinity of the thermal head 33.

Further, a plurality (five in this embodiment) of detection switches 49 (see FIG. 4) are disposed on the bottom face section of the cassette accommodating section 27, and when the tape cassette 26 is set on the cassette accommodating section 27, the detection switches 49 are turned ON/OFF selectively through plural (five in this embodiment) convex/concave sections (not shown) formed on the bottom face of the tape cassette 26.

The tape cassette 26 incorporates the print tape 9 and the print ribbon, and the kinds of the tape cassette 26 for use in the tape print apparatus 1 of this embodiment are distinguished depending on a combination of the tape width of the incorporated print tape 9 and the print ribbon. More specifically, there are six kinds of the tape width of the print tape 9: 6 mm, 9 mm, 12 mm, 18 mm, 24 mm, 36 mm, and as the print ribbon, there are three kinds thereof, namely: laminate print ribbon, receptor print ribbon and cloth transfer print ribbon. Therefore, 18 kinds (6×3) of combinations between the tape width of the print tape 9 and print ribbon of the print tape 9 are available. The combination between the kind of the tape width of the print tape 9 and the kind of the print ribbon incorporated in the print tape 9 contained in the tape cassette 26 is detected based on the combination of switches 49 turned ON or OFF by the installed cassette 26.

The convex/concave sections for specifying the combination of the kinds of the tape width of the print tape 9 and the print ribbon contained in the tape cassette 26 are formed selectively on the bottom face of the tape cassette 26, and when the tape cassette 26 is set in the cassette accommodating section 27, those convex/concave sections turn ON/OFF the five detection switches 49 selectively. Consequently, a switch signal pattern composed of ON/OFF switch signals is obtained from the detection switches 49.

As the print tape 9, a heat sensitive color development tape having a heat sensitive color development layer can be used for the tape cassette 26, and some tape cassettes contain no print ribbon because it is not necessary. Six kinds of the widths of the heat sensitive color development tapes: 6 mm, 9 mm, 12 mm, 18 mm, 24 mm, 36 mm are available. The tape cassette which contains only the heat sensitive color development tape, but no print ribbon, incorporates the heat sensitive color development tape as the print tape. The convex/concave sections for specifying the width of the heat sensitive color development tape are formed selectively and when the tape cassette is set in the cassette accommodating section 27, these convex/concave sections turn ON/OFF the five detection switches selectively.

On the other hand, the ROM 58, which will be described later, accommodates a tape cassette detection table corresponding to a combination of the kinds of the tape width of the print tape 9 contained in the tape cassette 26 and print ribbon and switch signal patterns obtained by the detection switches 49.

By referring to a switch signal pattern output from the detection switches 49 and the tape cassette detecting table when the tape cassette 26 is set in the cassette accommodating section 27, a combination of the kinds of the tape width of the print tape 9 contained in the tape cassette 26 and the print ribbon is detected.

A control system containing a control unit CU for controlling the print mechanism PM and the liquid crystal display 6 will be described.

Figure 4:
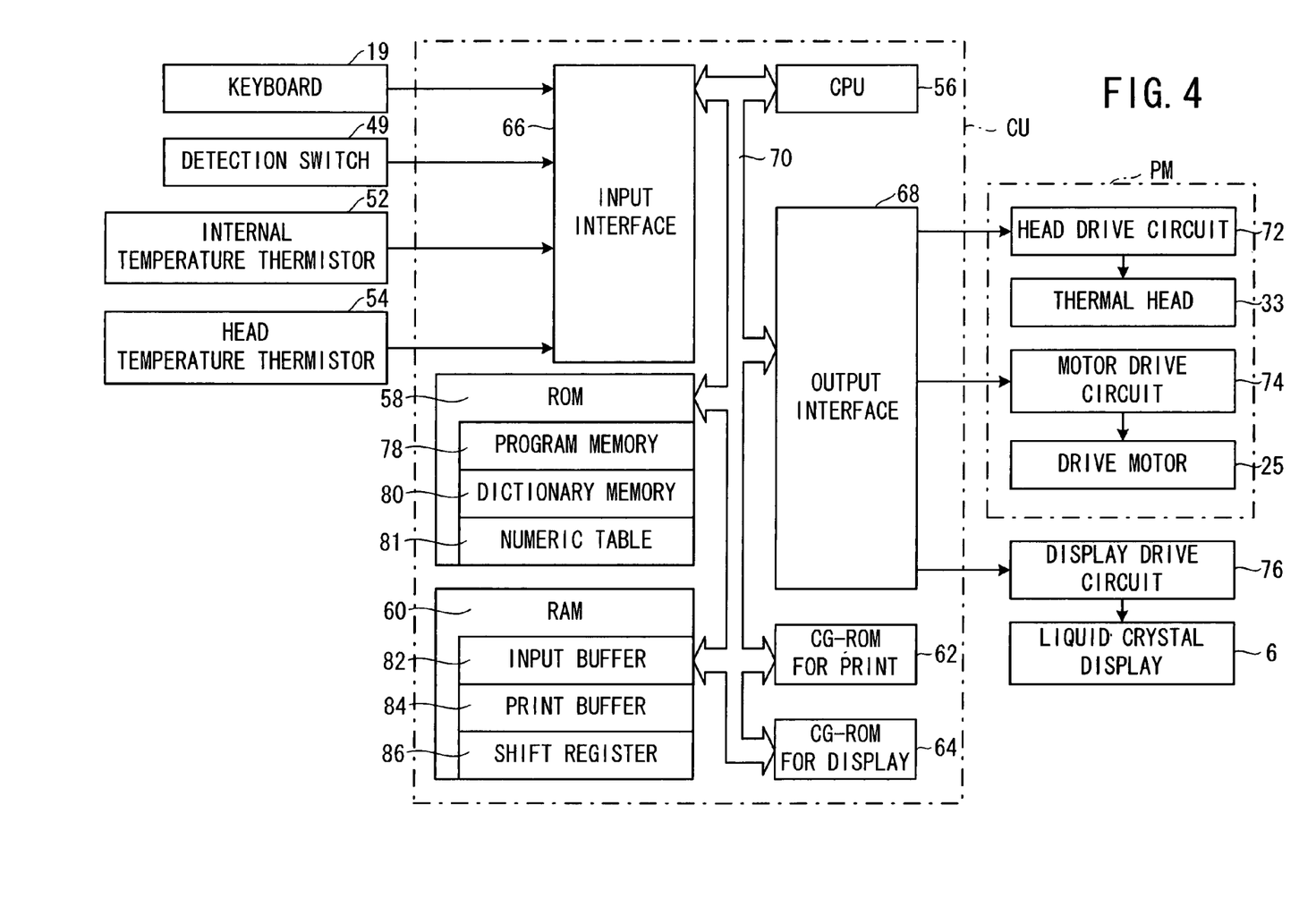
FIG. 4 is a block diagram of control system of the tape print apparatus of the FIG. 1 embodiment.

As shown in FIG. 4, the liquid crystal display 6, the detection switches 49 for detecting the kind of the tape cassette 26, that is, the kinds of the tape width of the print tape and print ribbon, the internal temperature thermistor 52 for detecting the internal temperature inside the main body and the head temperature thermistor 54 for detecting the head temperature of the thermal head, are connected to the control unit CU through the keyboard 19, print mechanism PM and display drive circuit 76, respectively.

The control unit CU includes a CPU 56, ROM 58, RAM 60, CG-ROM 62 for print, display CG-ROM 64 for representation on the display 6, input interface 66 and output interface 68, these units being connected to each other through a bus 70. The keyboard 19, detection switches 49, internal temperature thermistor 52 and head temperature thermistor 54 are connected to the input interface 66.

An input buffer 82 for memorizing input data, a print buffer 84 for memorizing print data, a shift register 86 and other kinds of counters and registers are provided in the RAM 60.

Dot pattern data of multiple characters to be printed are memorized in the CG-ROM 62 for print corresponding to code data. Display dot pattern data of multiple characters to be printed are memorized in the CG-ROM 64 for display corresponding to code data.

Further, a head drive circuit 72 for driving the thermal head 33 as part of the print mechanism PM, a motor drive circuit 74 for driving the drive motor 25 which rotates the platen roller 23 as part of the print mechanism PM and the display drive circuit 76 are connected to the output interface 68.

The ROM 58 includes a program memory 78 for storing power weakness determination processing programs and various other kinds of programs for control of the tape print apparatus 1, the aforementioned tape cassette detection table, and a numeric table 81 including a first table describing the relation among the internal temperature t, head temperature and weak voltage value, which will be described later, a second table describing the relation between the print ribbon and coefficient, a third table describing the relation between the width of the print tape 9 and coefficient and a fourth table describing the relation between the number and coefficient of the heat generating devices for use for printing and a dictionary memory 80 used for conversion of text input through the keyboard 19. In the meantime, the ROM 58 accommodates an initial weak voltage value which serves as the criterion of whether or not battery weakness should be indicated.

Figure 5A:
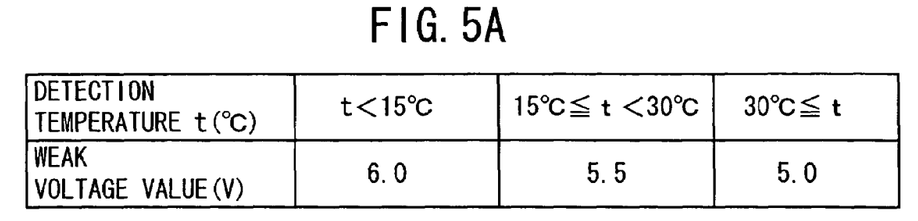
FIG. 5A is a numeric table of the tape print apparatus of the FIG. 1 embodiment.

The numeric table 81 will be described with reference to FIGS. 5A–5D. The first table describes the relation between the detection temperature t detected by the internal temperature thermistor 52 and head temperature thermistor 54 and the initial weak voltage value. If the detection temperature t is less than 15° C. (t<15° C.) as shown in FIG. 5A, the initial weak voltage value 6.0 V is selected. If the detection temperature t is greater than or equal to 15° C. and less than 30° C. (15° C.≦t<30° C.), 5.5 V is selected as the initial weak voltage value, and if the detection temperature t is greater than or equal to 30° C. (30° C.≦t), 5.0 V is selected as the initial weak voltage value.

Figure 5B:
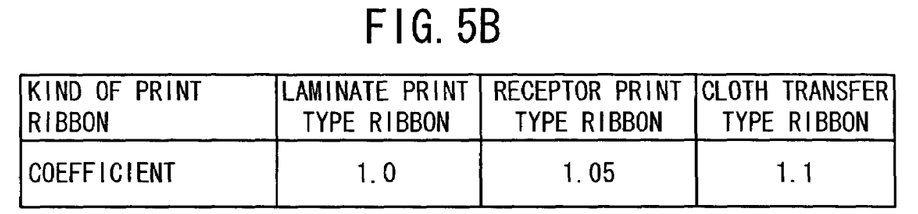
FIG. 5B is a numeric table of the tape print apparatus of the FIG. 1 embodiment.

Next, the second table describes the relation between the kind of the print ribbon and coefficient for use in power weakness determination processing. If the print ribbon is of laminate type as shown in FIG. 5B, 1.0 is selected as coefficient and if it is of receptor type, 1.05 is selected. Further, in case of cloth transfer type, 1.1 is selected as coefficient.

Figure 5C:
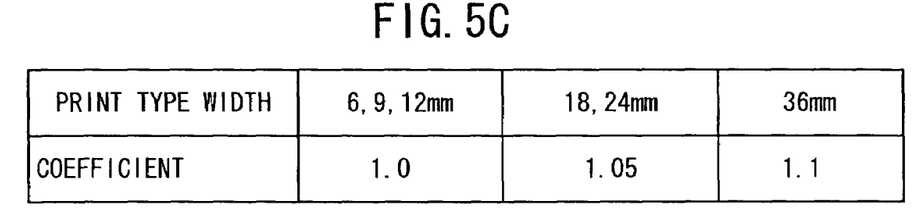
FIG. 5C is a numeric table of the tape print apparatus of the FIG. 1 embodiment.
Figure 5D:
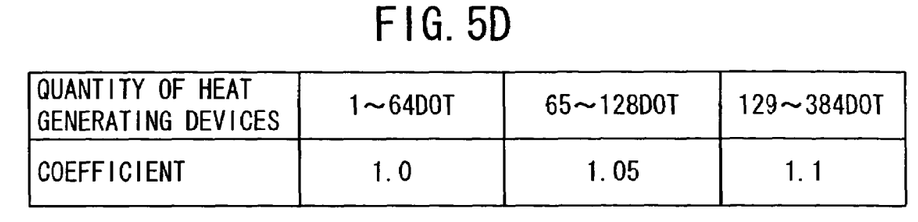
FIG. 5D is a numeric table of the tape print apparatus of the FIG. 1 embodiment.

The third table describes the relation between the tape width of the print tape 9 and the coefficient for use in power weakness determination processing. If the tape width is any of three kinds, 6, 9, and 12 mm as shown in FIG. 5C, 1.0 is selected as coefficient and if the tape width is one of 18 and 24 mm, 1.05 is selected as coefficient. If the tape width is 36 mm, 1.1 is selected as coefficient.

The fourth table describes the relation between the number of heat generating devices for use in printing and a coefficient for use in power weakness determination processing. If the number of the heat generating devices is 1–64 dots as shown in FIG. 5C, 1.0 is selected as coefficient and if it is 65–128 dots, 1.05 is selected as coefficient. If the number of the heat generating devices is 129–384 dots, 1.1 is selected as coefficient.

Figure 6:
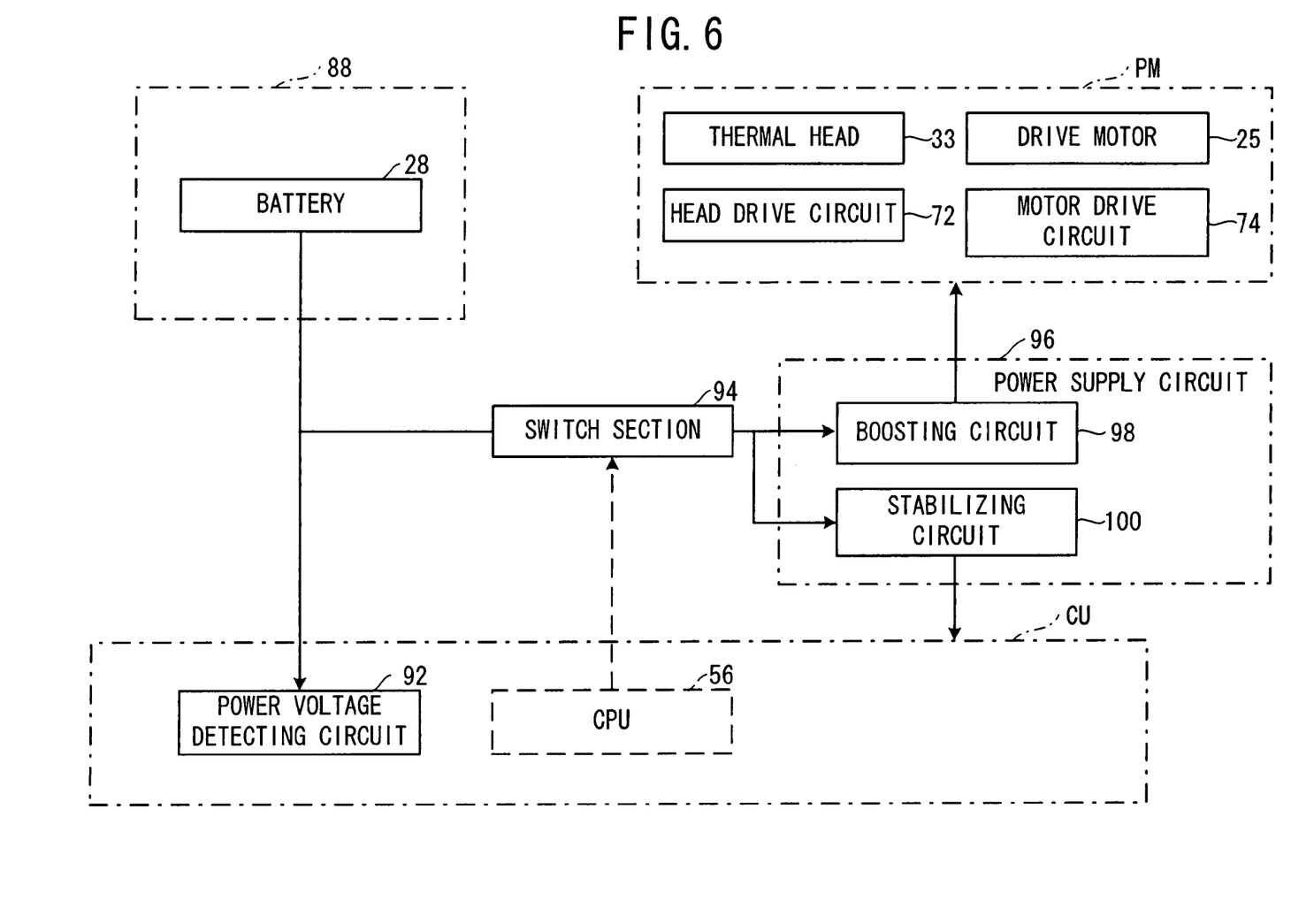
FIG. 6 is a block diagram of power supply system in the tape print apparatus of the FIG. 1 embodiment.

Next, the structure of the power supply system will be described with reference to FIG. 6. First, a power supply unit 88 outputs a predetermined DC voltage (9V because six 1.5V batteries 28 are accommodated in series in a battery accommodating section 29 in this embodiment) and this predetermined DC voltage is supplied to a power supply voltage detecting circuit 92 within the control unit CU, and also to a power supply circuit 96 through a switch section 94. In the meantime, the power supply voltage detecting circuit 92 functions as a drive voltage detecting means. The switch section 94 is provided with a switch actuated mechanically and is turned OFF according to an OFF signal from the CPU 56 in the control unit CU. If the switch is short-circuited, the switch section 94 supplies the voltage output from the power supply unit 88 directly to the power supply circuit 96.

The power supply circuit 96 contains a boosting circuit 98 and a stabilizing circuit 100, and its voltage is raised by the boosting circuit 98 and supplied to the print mechanism PM.

On the other hand, the voltage is lowered by the stabilizing circuit 100 and a stabilized voltage is supplied to the control unit CU. The power supply voltage detecting circuit 92 detects a voltage supplied from the power supply unit 88, and sends the result to the CPU 56, which converts to digital value by means of its internal A/D converter. The digital value is stored in the internal RAM and used for the power weakness determination processing, which will be described later.

Figure 7:
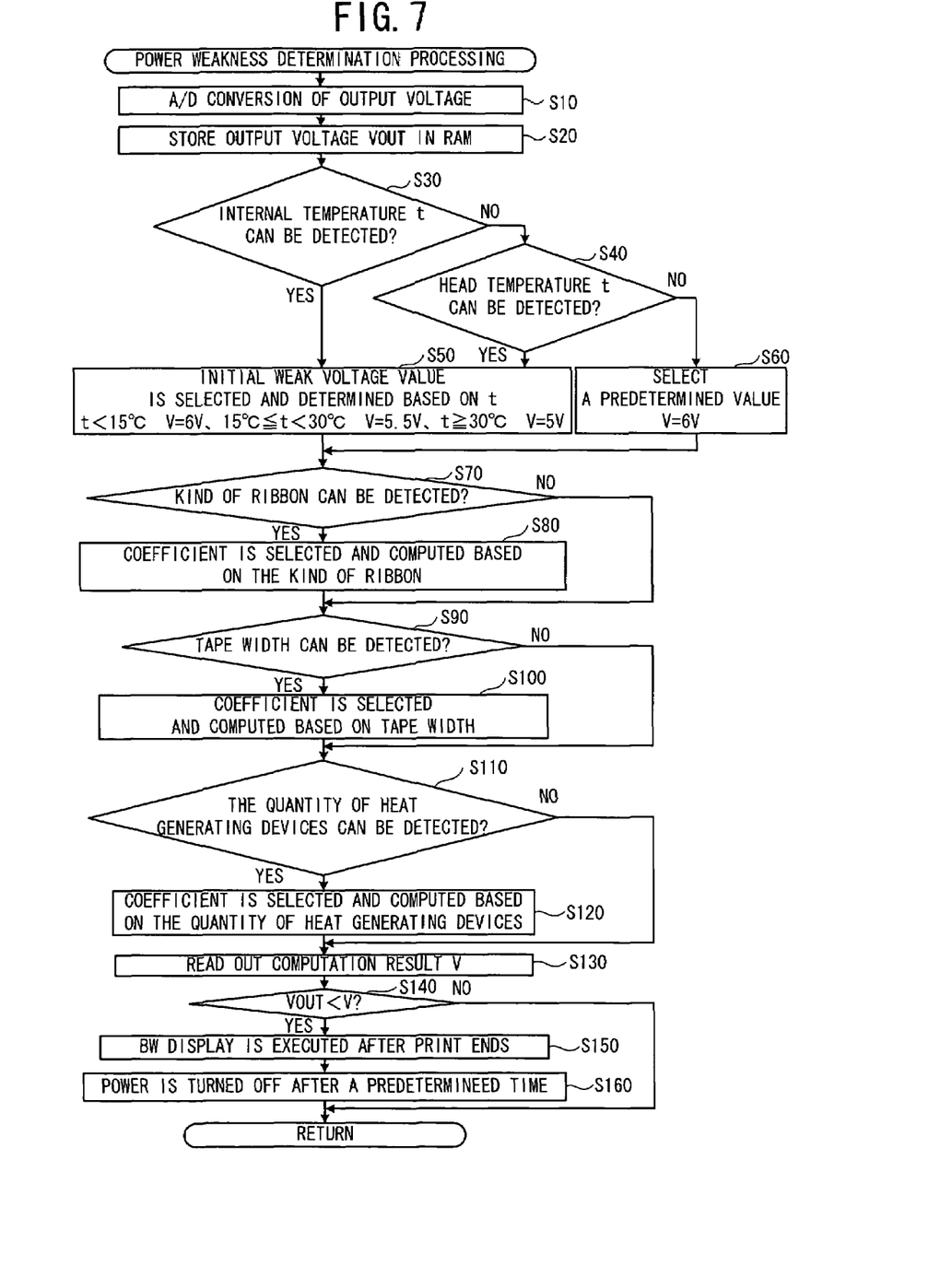
FIG. 7 is a flow chart of a power weak condition determination processing for the tape print apparatus of the FIG. 1 embodiment.

Next, the operation regarding the power weakness determination processing in the tape print apparatus 1 will be described with reference to a flow chart of FIG. 7. The power weakness determination processing determines power weakness at the time of print operation and when the print operation is actually being carried out after a print instruction has been dispatched by pressing the print key 15, this processing is executed.

In this power weakness determination processing, an output voltage Vout output from the power supply voltage detecting circuit 92 is A/D converted to a digital value (S10) and that output voltage Vout is stored in the internal RAM (S20).

Next, in S30, it is determined whether or not the internal temperature t within the main body 2 can be detected by the internal temperature thermistor 52 disposed in the main body 2 of the tape print apparatus 1. If the internal temperature t can be detected (S30: YES), the processing proceeds to S50. On the other hand, if the internal temperature t cannot be detected (S30: NO), it is determined whether or not the head temperature t can be detected by the head temperature thermistor 54 in S40. If the head temperature t can be detected (S40: YES), the processing proceeds to S50. On the other hand if the head temperature t cannot be detected (S40: NO), an initial weak voltage value (V=6.0 V) is read out from the ROM 58 as a criterion of whether or not battery weakness is indicated in S60, and this value is set in the RAM 60 as the weak voltage value. After that, the processing proceeds to S70.

The reason why the initial weak voltage value is set to 6.0 V is that as described above, the drive voltage of the drive power supply is 9 V and various operations in the tape print apparatus 1 need to be guaranteed based on such a drive voltage.

Further, the reason why the determinations in S30 and S40 are executed is to enable any kind of apparatus to be dealt with because some kinds of apparatus have neither the internal temperature thermistor 52 nor head temperature thermistor 54.

Subsequently, the processing to be executed in S50 if any internal temperature t or a head temperature t (hereinafter referred to as detection temperature t) is detected (S30: YES, S40: YES) will be described. That is, if the temperature t detected in the S30 or S40 is less than 15° C. (t<15° C.) in S50, the first table (FIG. 5A) stored in the ROM 58 is referred to and then, 6V is selected and decided as the weak voltage value V. If the detection temperature t is in a range of 15° C.≦t<30° C., 5.5 V is selected and decided as the weak voltage value V. Further, if the detection temperature is equal to or greater than 30° C. (t>30° C.), 5 V is selected and decided as the weak voltage value V.

The reason why the weak voltage value V can be changed corresponding to the detection temperature t is that if the ambient temperature inside the main body 2 is low, conversion efficiency of electric energy in the battery 28 constituting the drive power supply 88 also is low, so that its operation cannot be guaranteed unless the voltage value is high, and if the ambient temperature inside the main body 2 is high, the conversion efficiency of electric energy in the battery 28 is increased so that the operation can be guaranteed with a relatively low voltage value. Further, if the ambient temperature in the vicinity of the thermal head 33 is low, a large print energy is required so that the operation cannot be guaranteed unless the voltage is high, and if the ambient temperature in the vicinity of the thermal head 33 is high, print is enabled with a smaller print energy thereby guaranteeing the operation even with a relatively low voltage value.

A weak voltage value can be changed because it is selected from the first table (see FIG. 5A) stored in the ROM 58 corresponding to the ambient temperature in the main body 2 detected by the internal temperature thermistor 52 or the ambient temperature in the vicinity of the thermal head 33 detected by the head temperature thermistor 54. Consequently, an appropriate weak voltage value can be established based on each ambient temperature. When the drive voltage of each battery 28 is higher than the weak voltage value set variably as described above, the operation of the tape print apparatus 1 can be guaranteed securely.

In S70, it is determined whether or not the kind of the print ribbon contained in the tape cassette 26 can be detected. If the kind of the print ribbon can be detected based on a switch signal pattern output from the detection switches 49 and the tape cassette detection table stored in the ROM 58 (S70: YES), the processing proceeds to S80, and on the other hand, if the kind of the ribbon cannot be detected (S70: NO), the processing proceeds to S90.

In the case where the tape cassette contains the heat sensitive color development tape as the print tape 9 but no print ribbon, it is detected that the kind of the print ribbon cannot be detected.

In S80, the coefficient is selected based on the second table (see FIG. 5B) stored in the ROM 58 corresponding to the kind of the print ribbon detected in S70, a processing of multiplying the previously selected coefficient with a weak voltage value set in the RAM 60 is carried out.

As the weak voltage value set in the RAM 60, a weak voltage value set in S50 after S30 and/or S40 or a weak voltage value set in S60 exist. A weak voltage value obtained by multiplying the weak voltage value set in S50 with the coefficient is a weak voltage value which considers both a factor based on the internal temperature t and/or head temperature t and a factor based on the kind of the print ribbon.

The reason why the determination in S70 is executed is to enable to deal with any type of print apparatus because some kinds of the tape print apparatus 1 can use only one specific tape cassette 26 containing a predetermined print ribbon and such kind of the tape print apparatus 1 is provided with no detection switches 49.

Another reason why the determination in S70 is executed is to enable to deal with a case where a tape cassette accommodating the heat generating color development tape but no print ribbon is used.

As the print ribbon accommodated in the tape cassette 26, there are three kinds of the ribbons, that is, laminate print ribbon, receptor (so-called non-laminate type) and cloth transfer type print ribbon, and a coefficient is established for each print ribbon.

The laminate type print ribbon is a basic print ribbon used for the tape print apparatus 1 of this embodiment and because characters and the like printed on the print tape 9 are protected by a transparent film, it is not necessary to use an ink having a high viscosity (hard to peel off) as the ribbon ink used for the laminate type print ribbon. Therefore, the print energy by the heat generating device of the thermal head 33 does not need to be so high, so that its heat sensitivity level is of an intermediate level. For such a laminate type print ribbon, 1.0 is set as its coefficient if the second table (see FIG. 5B) is referred to.

In the case of the receptor type print, characters and the like printed on the print tape 9 do not need to be covered by any film. Therefore, it is desirable to use an ink having a relatively high viscosity (hard to peel off) as the ribbon ink used for the receptor type print ink, and such ink preferably uses a high print energy as a print energy by the heat generating device of the thermal head 33. Therefore, the heat sensitivity level of the receptor type print ribbon is relatively low, and for such a receptor type print ribbon, 1.1 is set as its coefficient if the second table (see FIG. 5B) is referred to.

The cloth transfer type ribbon is a print ribbon for use when producing a transfer type tape whose characters and the like are to be transferred onto clothes by heating with an iron or the like. For the print tape 9 on which characters and the like are printed to be used as a transfer tape, the ribbon ink for use in the cloth transfer print ribbon preferably has a low viscosity (easy to peel off). Therefore, the print energy by the heat generating device of the thermal head 33 may be low, so that its heat sensitivity level is relatively high. For such a cloth transfer ribbon, 0.9 is set up as its coefficient if the second table (see FIG. 5B) is referred to.

In this way, a coefficient is selected from the second table (see FIG. 5B) stored in the ROM 58 corresponding to the kind of the print ribbon accommodated in the tape cassette 26. The weak voltage value set in the RAM 60 is multiplied with that selected coefficient so as to change the weak voltage value. Thus, an appropriate weak voltage value can be established based on the kind of each print ribbon (heat sensitivity level) and if the drive voltage of each battery 28 is higher than the weak voltage value set variably as described above, characters and the like can be printed securely on the print tape 9 corresponding to the kind of the print ribbon.

In S90 after S80, it is determined whether or not the tape width of the print tape 9 accommodated in the tape cassette 26 can be detected. If the tape width of the print tape 9 can be detected based on a switch signal pattern output from the detection switches 49, and the third table (see FIG. 5C) stored in the ROM 58 (S90: YES), the processing proceeds to S100. On the other hand, if the width of the print ribbon cannot be detected (S90: NO), the processing proceeds to S110.

In S100, a coefficient is selected based on the third table (see FIG. 5C) stored in the ROM 58 corresponding to the tape width of the print tape 9 detected in S90, and then a processing of multiplying the selected coefficient with a weak voltage value set in the RAM 60 is carried out.

As the weak voltage value set in the RAM 60, a weak voltage value set in S50 after S30 and/or S40, a weak voltage value set in S60, or a weak voltage value set in S80 potentially exist. The weak voltage value obtained by multiplying the weak voltage value set in S80 after S50 with the coefficient is a weak voltage value which takes into account a factor by internal temperature t and/or head temperature t, a factor by the kind of the print ribbon and a factor by the tape width of the print tape 9.

The reason why the determination of the S90 is executed is to enable to deal with any type of print apparatus because some types of the tape print apparatus 1 can use only one a specific tape cassette 26 accommodating the print tape 9 having a predetermined tape width, and such a tape print apparatus 1 is provided with no detection switches 49.

As for the kind of the tape width of the print tape 9 accommodated in the tape cassette 26, there are six kinds of tape widths, namely: 6 mm, 9 mm, 12 mm, 18 mm, 24 mm and 36 mm, and coefficient is set for each kind of the tape width.

More specifically, print energy to be applied to the heat generating device of the thermal head 33 increases in proportion to the tape width of the print tape 9 so that the power consumption of the drive power supply 88 increases. Because in such a case, the print action of the tape print apparatus 1 needs to be secured, a coefficient 1.0 is set for the print tape 9 having a width of 6 mm, 9 mm, and 12 mm when the third table (see FIG. 5C) is referred to. A coefficient of 1.05 is set for the print tape 9 having a width of 18 mm and 24 mm and further, a coefficient of 1.1 is set for the print tape 9 having a tape width of 36 mm.

A coefficient is selected from the third table (see FIG. 5C) stored in the ROM 58 corresponding to the kind of the tape width of the print tape 9 contained in the tape cassette 26, and a weak voltage value set in the RAM 60 is multiplied with that selected coefficient so as to change the weak voltage value. Thus, an appropriate weak voltage value can be set corresponding to the tape width of each print tape 9.

If the drive voltage of each battery 28 is higher than the weak voltage value set variably as described above, characters and the like can be printed securely on the print tape 9 corresponding to each tape width of the print tape 9.

In S110 after S100, it is determined whether or not the quantity of the heat generating devices for use when printing characters and the like through the thermal head 33 can be distinguished. This determination is carried out by acquiring maximum height data of characters and the like in text data (print data) memorized in the print buffer 84 of the RAM 60 and further detecting the quantity of heat generating devices necessary for printing characters and the like having that acquired maximum height data.

If the quantity of the heat generating devices of the thermal head 33 used for printing characters and the like can be distinguished (S110: YES), the processing proceeds to S120, and if the quantity of the heat generating devices cannot be distinguished (S110: NO), the processing proceeds to S130.

In S120, a coefficient is selected based on the fourth table (see FIG. 5D) stored in the ROM 58 corresponding to the quantity of the heat generating devices of the thermal head 33 detected in S110 and at the same time, a processing of multiplying the weak voltage value set in the RAM 60 with that selected coefficient is carried out.

As the weak voltage value set in the RAM 60, a weak voltage value set in S50 after S30 and/or S40, a weak voltage value set in S80, or a weak voltage value set in S100 potentially exist. The weak voltage value obtained by multiplying the weak voltage value set in S100 after the S50/S80 with the coefficient is a weak voltage value which takes into account a factor by internal temperature t and/or head temperature t, a factor by the kind of the print ribbon, a factor by the tape width of the print tape 9 and a factor by the quantity of the heat generating devices to be used in the thermal head 33.

The reason why the determination in S110 is executed is to enable to deal with any type print apparatus because some types of the tape print apparatus 1 do not execute a processing of detecting the quantity of the heat generating devices in the thermal head 33 for use in printing.

384 heat generating devices (384 dots) may be provided on the thermal head 33, and a coefficient is set corresponding to the range in quantity of the heat generating devices to be used in printing.

More specifically, print energy to be applied increases proportional to the quantity of the heat generating devices to be used in printing so that the power consumption of the drive power supply 88 increases. Because in such a case, the print action of the tape print apparatus 1 needs to be guaranteed, a coefficient 1.0 is set if the quantity of the heat generating devices is in a range of 1–64 dots when the fourth table (see FIG. 5D) is referred to. A coefficient of 1.05 is set if the quantity of the heat generating devices is in a range of 65–128 dots. If the quantity of the heat generating devices is in a range of 129–384 dots, a coefficient of 1.1 is set.

A coefficient is selected from the fourth table (see FIG. 5D) stored in the ROM 58 corresponding to the quantity of the heat generating devices to be used in printing characters and the like, and the weak voltage value set in the RAM 60 is multiplied with that selected coefficient so as to change the weak voltage value. Thus, an appropriate weak voltage value can be set based on the quantity of the heat generating devices even if the quantity of the heat generating devices to be used changes in various ways. If the drive voltage of each battery 28 is higher than the weak voltage value set variably as described above, characters and the like can be printed securely on the print tape 9 corresponding to the quantity of the heat generating devices for use.

In S130, a weak voltage value V which is determined in S50 and set in the RAM 60, an initial weak voltage value set in the RAM 60 in S60, a weak voltage value set in the RAM 60 in S80, a weak voltage value set in the RAM 60 in S100 or a weak voltage value set in the RAM in S120 is read out from the RAM 60.

For example, if the ambient temperature inside the main body 2 is 20° C., the cassette tape 26 containing the 18-mm print tape 9 and the laminate type print ribbon is accommodated in the cassette accommodating section 27, and the quantity of the heat generating devices in the thermal head 33 is 96 dots, the weak voltage value V is set to 5.5 V if the detection temperature t is 15° C.$\leq$t<30° C., and in next S80, 5.5 V obtained by multiplying the weak voltage value V set in S50 with a coefficient of 1.0 for the laminate type print ribbon is set. Then, in S100, 5.775 V obtained by multiplying the weak voltage value V set in S80 with a coefficient of 1.05 for the print tape 9 having a tape width of 18 mm is set. Further, in S120, 6.06375 V obtained by multiplying the weak voltage value set V in S100 with a coefficient of 1.05 in case where the quantity of the heat generating devices is in a range of 65 dots–128 dots is set. In S130, 6.06375 V set in S120 is read out as the weak voltage value V.

In the meantime, in a processing of multiplying the weak voltage value V set in each of S80, S100, S120 with a coefficient, a processing of rounding to one decimal place may be carried out. That is, in the above case, 5.8 V is set in S100 and 6.1 V is set in S120.

Further, if the ambient temperature in the vicinity of the thermal head 33 is 12° C., the tape cassette 26 containing the 36-mm print tape 9 and the receptor type print ribbon is accommodated in the cassette accommodating section 27, and the quantity of the heat generating devices in the thermal head 33 is 256 dots, in S50, the weak voltage V is set to 6 V of a case where the detection temperature t is t<15° C. and in next S80, 6.6V obtained by multiplying the weak voltage value V set in S50 with a coefficient of 1.1 for the receptor type print ribbon is set. Then, in S100, 7.26V obtained by multiplying the weak voltage value set V in S80 with a coefficient of 1.1 for the print tape 9 having a tape width of 36 mm is set. Further, in S120, 7.986V obtained by multiplying the weak voltage value set V in S100 with a coefficient of 1.1 in case where the quantity of the heat generating devices is in a range of 129 dots–384 dots is set and in S130, 7.986V set in S120 is read out as the weak voltage value V.

In the meantime, in a processing of multiplying the weak voltage value V set in each of S80, S100, S120 with a coefficient, a processing of rounding to one decimal place may be carried out. If this processing is carried out, 7.3 V is set in S100 and 8.0 V is set in S120.

After that, in S140, it is determined whether or not output (drive) voltage value Vout from the batteries 28 of the drive power supply 88 stored in the RAM 60 in S20 is smaller than the weak voltage read out from the RAM 60. If the output voltage value Vout is smaller than the weak voltage value V (S140: YES), there is a fear that a trouble may occur in various kinds of the operations in the tape print apparatus 1. Thus, after text data set in the print buffer 84 is printed out, in SI 50 the liquid crystal display 6 indicates that the battery is weak. For example, a message saying "Battery weak. Replace battery" may be indicated on the liquid crystal display 6. In S160, a processing of turning off the power after a predetermined time elapses is carried out. Consequently, the power weakness determination processing is ended.

If the drive voltage value Vout from the batteries 28 becomes smaller than a weak voltage value V determined corresponding to the ambient temperature inside the main body 2, or the ambient temperature in the vicinity of the thermal head 33 detected by the head temperature thermistor 54, a weak voltage value V computed corresponding to the kind of the print ribbon, a weak voltage value computed corresponding to the tape width of the print tape 9, or a weak voltage computed corresponding to the quantity of the heat generating devices in the thermal head 33 for use in printing, a message indicating the battery weak condition is provided on the liquid crystal display 6. Thus, even if the ambient temperature inside the main body 2 or the ambient temperature in the vicinity of the thermal head 33 changes, or the tape width of the print ribbon or print tape 9 or the quantity of the heat generating devices in the thermal head 33 is changed, the battery weak condition can be indicated appropriately on the liquid crystal display 6 correspondingly.

Because the battery weak condition can be indicated on the liquid crystal display (S150) after printing of the text data by the print buffer 84 is ended, even if the output voltage value Vout becomes smaller than the weak voltage value (S140: YES), even if the drive voltage value Vout from the batteries 28 becomes smaller than the weak voltage value, interruption of text data print can be prevented.

Contrary to this, if the output voltage Vout is larger than the weak voltage value V in S140 (S140: NO), various kinds of the operation in the tape print apparatus 1 can be carried out appropriately, and thus the battery weakness determination processing is ended at this point of time.

According to this embodiment, if the drive voltage value becomes smaller than the weak voltage value V computed corresponding to the ambient temperature inside the main body 2, or the ambient temperature in the vicinity of the thermal head, the kind of the print ribbon, the tape width of the print tape or the quantity of the heat generating devices of the thermal head, a message indicating the battery weakness condition is provided on the liquid crystal display. Thus, the power weakness condition is notified appropriately, not based on a standard condition, but rather on usage conditions of a user, thereby preventing print failure due to power weakness more appropriately than conventionally.

The present invention is not restricted to the above-described embodiments.

Although, in the above-described embodiments, the processing of determining power weakness corresponding to all the factors including the internal temperature or head temperature, kind of the print ribbon, width of the print tape and the quantity of the heat generating devices is executed, it is permissible to construct the apparatus corresponding to two or three of these factors. Consequently, the quantity of components is reduced, thereby a cheaper and more compact tape print apparatus being provided.

In the illustrated embodiment, the controller (control unit CU) preferably is implemented using a suitably programmed general purpose computer, e.g., a microprocessor, microcontroller or other processor device (CPU or MPU). It will be appreciated by those skilled in the art, that the controller also can be implemented as a single special purpose integrated circuit (e.g., ASIC) having a main or central processor section for overall, system-level control, and separate sections dedicated to performing various different specific computations, functions and other processes under control of the central processor section. The controller also can be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller also can be implemented using a suitably programmed general purpose computer in conjunction with one or more peripheral (e.g., integrated circuit) data and signal processing devices. In general, any device or assembly of devices on which a finite state machine capable of implementing the described procedures can be used as the controller of the invention.

While the invention has been described with reference to exemplary embodiments, it is to be understood that the invention is not limited to the exemplary embodiments or constructions. While the various elements of the exemplary embodiments are shown in various combinations and configurations, which are exemplary, other combinations and configurations, including more, less or only a single element, are also within the spirit and scope of the invention.

What is claimed is:

1. A tape print apparatus comprising:
   a cassette accommodating section formed in a main body thereof, for accommodating a tape cassette containing a print tape;
   a thermal head in which a plurality of heat generating devices are arranged and which prints on the print tape pulled out from the tape cassette by a tape feeding mechanism;
   a display;
   an internal temperature detector that detects an internal temperature in the main body;
   voltage value determining means for determining a weak voltage value based on the internal temperature inside the main body detected by the internal temperature detector; and
   means for indicating on the display whether a drive voltage of a drive power supply of the tape print apparatus is below the weak voltage value determined by the voltage value determining means.

2. The tape print apparatus according to claim 1, further comprising:
   a ribbon detector that detects a kind of a print ribbon contained in the tape cassette; and
   weak voltage value changing means for changing the weak voltage value determined by the voltage value determining means based on the kind of the print ribbon detected by the ribbon detector.

3. The tape print apparatus according to claim 1, further comprising:
   a tape width detector that detects a tape width of the print tape contained in the tape cassette; and
   weak voltage value changing means for changing the weak voltage value determined by the voltage value determining means based on the tape width detected by the tape width detector.

4. The tape print apparatus according to claim 1, further comprising:
   heat generating device quantity detecting means for detecting a quantity of heat generating devices to be used for printing out of plural heat generating devices arranged on the thermal head; and
   weak voltage value changing means for changing the weak voltage value determined by the voltage value determining means based on the quantity of the heat generating devices detected by the heat generating device quantity detecting means.

5. The tape print apparatus according to claim 1, further comprising:

two of: (1) a ribbon detector that detects a kind of a print ribbon contained in the tape cassette, (2) a tape width detector that detects a tape width of the print tape contained in the tape cassette, and (3) a heat generating device quantity detecting means for detecting a quantity of heat generating devices to be used for printing out of plural heat generating devices arranged on the thermal head, the tape print apparatus further comprising:

weak voltage value changing means for changing the weak voltage value determined by the voltage value determining means based on the two detected ones of: (1) the kind of the print ribbon, (2) the kind of the tape width and (3) the quantity of the heat generating devices on the thermal head.

6. The tape print apparatus according to claim 1, further comprising:

(1) a ribbon detector that detects a kind of a print ribbon contained in the tape cassette, (2) a tape width detector that detects a tape width of a print tape contained in the tape cassette, and (3) heat generating device quantity detecting means for detecting a quantity of heat generating devices to be used for printing out of plural heat generating devices arranged on the thermal head, the tape print apparatus further comprising:

weak voltage value changing means for changing the weak voltage value determined by the voltage value determining means based on the detected kind of the print ribbon, the detected kind of the tape width of the print tape and the detected quantity of the heat generating devices on the thermal head.

7. The tape print apparatus according to claim 5, further comprising:

drive voltage detecting means for detecting a drive voltage of the drive power supply when printing is performed by the thermal head; and display control means for, if the drive voltage of the drive power supply detected by the drive voltage detecting means is smaller than the weak voltage value changed by the weak voltage value changing means, displaying that fact on the display.

8. The tape print apparatus according to claim 6, further comprising:

drive voltage detecting means for detecting a drive voltage of the drive power supply when printing is performed by the thermal head; and display control means for, if the drive voltage of the drive power supply detected by the drive voltage detecting means is smaller than the weak voltage value changed by the weak voltage value changing means, displaying that fact on the display.

9. A tape print apparatus comprising:

a cassette accommodating section formed in a main body thereof, for accommodating a tape cassette containing a print tape;

a thermal head in which a plurality of heat generating devices are arranged and which prints on the print tape pulled out from the tape cassette by a tape feeding mechanism;

a display;

a head temperature detector that detects a temperature of the thermal head;

voltage value determining means for determining a weak voltage value based on the head temperature of the thermal head detected by the head temperature detector; and means for indicating on the display whether a drive voltage of a drive power supply of the tape print apparatus is below the weak voltage value determined by the voltage value determining means.

10. The tape print apparatus according to claim 9, further comprising:

a ribbon detector that detects a kind of a print ribbon contained in the tape cassette; and weak voltage value changing means for changing the weak voltage value determined by the voltage value determining means based on the kind of the print ribbon detected by the ribbon detector.

11. The tape print apparatus according to claim 9, further comprising:

a tape width detector that detects a tape width of the print tape contained in the tape cassette; and weak voltage value changing means for changing the weak voltage value determined by the voltage value determining means based on the tape width detected by the tape width detector.

12. The tape print apparatus according to claim 9, further comprising:

heat generating device quantity detecting means for detecting a quantity of heat generating devices to be used for printing out of plural heat generating devices arranged on the thermal head; and weak voltage value changing means for changing the weak voltage value determined by the voltage value determining means based on the quantity of the heat generating devices detected by the heat generating device quantity detecting means.

13. The tape print apparatus according to claim 9, further comprising:

two of: (1) a ribbon detector that detects a kind of a print ribbon contained in the tape cassette, (2) a tape width detector that detects a tape width of the print tape contained in the tape cassette, and (3) a heat generating device quantity detecting means for detecting a quantity of heat generating devices to be used for printing out of plural heat generating devices arranged on the thermal head, the tape print apparatus further comprising:

weak voltage value changing means for changing the weak voltage value determined by the voltage value determining means based on the two detected ones of: (1) the kind of the print ribbon, (2) the kind of the tape width of the print tape and (3) the quantity of the heat generating devices on the thermal head.

14. The tape print apparatus according to claim 9, further comprising:

(1) a ribbon detector that detects a kind of a print ribbon contained in the tape cassette, (2) a tape width detector that detects a tape width of the print tape contained in the tape cassette, and (3) heat generating device quantity detecting means for detecting a quantity of heat generating devices to be used for printing out of plural heat generating devices arranged on the thermal head, the tape print apparatus further comprising:

weak voltage value changing means for changing the weak voltage value determined by the voltage value determining means based on the detected kind of the print ribbon, the detected kind of the tape width and the detected quantity of the heat generating devices on the thermal head.

15. The tape print apparatus according to claim 13, further comprising:

drive voltage detecting means for detecting a drive voltage of the drive power supply when printing is performed by the thermal head; and display control means for, if the drive voltage of the drive power supply detected by the drive voltage detecting means is smaller than the weak voltage value changed by the weak voltage value changing means, displaying that fact on the display.

16. The tape print apparatus according to claim 14, further comprising:

drive voltage detecting means for detecting a drive voltage of the drive power supply when printing is performed by the thermal head; and display control means for, if the drive voltage of the drive power supply detected by the drive voltage detecting means is smaller than the weak voltage value changed by the weak voltage value changing means, displaying that fact on the display.

17. A tape print apparatus comprising:

a cassette accommodating section formed in a main body of the tape print apparatus, for accommodating a tape cassette containing a print tape;

a thermal head having a plurality of heat generating devices, and which prints on the print tape pulled out from the tape cassette by a tape feeding mechanism;

a display;

a temperature detector that detects a temperature inside of the tape print apparatus; and a controller that determines a weak voltage value based on the detected temperature, and that indicates on the display whether a drive voltage of a drive power supply of the tape print apparatus is below the determined weak voltage value.

18. The tape print apparatus according to claim 17, wherein the temperature detector detects a temperature within the main body of the tape print apparatus.

19. The tape print apparatus according to claim 17, wherein the temperature detector detects a temperature of the thermal head.

20. The tape print apparatus according to claim 17, further comprising:

a ribbon detector that detects a kind of a print ribbon contained in the tape cassette;

wherein the controller determines the weak voltage value based on: (1) the detected temperature, and (2) the kind of the print ribbon detected by the ribbon detector.

21. The tape print apparatus according to claim 17, further comprising:

a tape width detector that detects a tape width of the print tape contained in the tape cassette; and wherein the controller determines the weak voltage value based on: (1) the detected temperature, and (2) the tape width detected by the tape width detector.

22. The tape print apparatus according to claim 17, wherein the controller determines a quantity of the heat generating devices to be used for printing out of the plural heat generating devices of the thermal head, and determines the weak voltage value based on: (1) the detected temperature, and (2) the determined quantity of the heat generating devices.

23. The tape print apparatus according to claim 20, further comprising:

a tape width detector that detects a tape width of the print tape contained in the tape cassette; and wherein the controller determines the weak voltage value also based on the tape width detected by the tape width detector.

24. The tape print apparatus according to claim 22, further comprising:

a tape width detector that detects a tape width of the print tape contained in the tape cassette; and wherein the controller determines the weak voltage value also based on the tape width detected by the tape width detector.

25. The tape print apparatus according to claim 20, wherein the controller determines a quantity of the heat generating devices to be used for printing out of the plural heat generating devices of the thermal head, and determines the weak voltage value also based on the determined quantity of the heat generating devices.

26. The tape print apparatus according to claim 21, wherein the controller determines a quantity of the heat generating devices to be used for printing out of the plural heat generating devices of the thermal head, and determines the weak voltage value also based on the determined quantity of the heat generating devices.

27. The tape print apparatus according to claim 23, wherein the controller determines a quantity of the heat generating devices to be used for printing out of the plural heat generating devices of the thermal head, and determines the weak voltage value also based on the determined quantity of the heat generating devices.

28. A method of controlling a tape print apparatus having a cassette accommodating section formed in a main body of the tape print apparatus, for accommodating a tape cassette containing a print tape and a thermal head having a plurality of heat generating devices, and which prints on the print tape pulled out from the tape cassette by a tape feeding mechanism, the method comprising:

detecting a temperature inside of the tape print apparatus;

determining a weak voltage value based on the detected temperature; and indicating on a display whether a drive voltage of a drive power supply of the tape print apparatus is below the determined weak voltage value.

29. The method according to claim 28, wherein the detected temperature is a temperature within the main body of the tape print apparatus.

30. The method according to claim 28, wherein the detected temperature is a temperature of the thermal head.

31. The method according to claim 28, further comprising:

detecting a kind of a print ribbon contained in the tape cassette; and wherein the weak voltage value also is determined based on the detected kind of the print ribbon.

32. The method according to claim 31, further comprising:

detecting a tape width of the print tape contained in the tape cassette; and wherein the weak voltage value also is determined based on the detected tape width.

33. The method according to claim 32, further comprising:

determining a quantity of the heat generating devices to be used for printing out of the plural heat generating devices of the thermal head; and wherein the weak voltage value also is determined based on the determined quantity of the heat generating devices.

34. The method according to claim 31, further comprising:

determining a quantity of the heat generating devices to be used for printing out of the plural heat generating devices of the thermal head; and wherein the weak voltage value also is determined based on the determined quantity of the heat generating devices.

35. The method according to claim 28, further comprising:

detecting a tape width of the print tape contained in the tape cassette; and wherein the weak voltage value also is determined based on the detected tape width.

36. The method according to claim 35, further comprising:

determining a quantity of the heat generating devices to be used for printing out of the plural heat generating devices of the thermal head; and wherein the weak voltage value also is determined based on the determined quantity of the heat generating devices.

37. The method according to claim 28, further comprising:

determining a quantity of the heat generating devices to be used for printing out of the plural heat generating devices of the thermal head; and wherein the weak voltage value also is determined based on the determined quantity of the heat generating devices.

38. The method according to claim 37, further comprising:

detecting a tape width of the print tape contained in the tape cassette; and wherein the weak voltage value also is determined based on the detected tape width.

39. A thermal printer comprising:

a cassette accommodating section formed in a main body of the thermal printer, for accommodating a cassette containing an image receiving medium;

a thermal head in which a plurality of heat generating devices are arranged and which prints on the image receiving medium fed from the cassette by a feeding mechanism;

a display;

a temperature detector that detects a temperature inside of the thermal printer; and a controller that determines a weak voltage value based on the detected temperature, and that indicates on the display whether a drive voltage of a drive power supply of the thermal printer is below the determined weak voltage value.

40. The thermal printer according to claim 39, wherein the temperature detector detects a temperature within the main body of the thermal printer.

41. The thermal printer according to claim 39, wherein the temperature detector detects a temperature of the thermal head.

42. The thermal printer according to claim 39, wherein the controller determines a quantity of the heat generating devices to be used for printing out of the plurality of heat generating devices of the thermal head, and determines the weak voltage value based on: (1) the detected temperature, and (2) the determined quantity of the heat generating devices.

43. A method of controlling a thermal printer having a cassette accommodating section formed in a main body of the thermal printer, for accommodating a cassette containing an image receiving medium, and a thermal head having a plurality of heat generating devices, and which prints on the image receiving medium fed from the cassette by a feeding mechanism, the method comprising:

detecting a temperature inside of the thermal printer;

determining a weak voltage value based on the detected temperature; and indicating on a display whether a drive voltage of a drive power supply of the thermal printer is below the determined weak voltage value.

44. The method according to claim 43, wherein the detected temperature is a temperature within the main body of the thermal printer.

45. The method according to claim 43, wherein the detected temperature is a temperature of the thermal head.

46. The method according to claim 43, further comprising:

determining a quantity of the heat generating devices to be used for printing out of the plurality of heat generating devices of the thermal head; and wherein the weak voltage value also is determined based on the determined quantity of the heat generating devices.

* * * * *